United States Patent Office

3,244,520
Patented Apr. 5, 1966

3,244,520
COLOR COUPLERS FOR PHOTOGRAPHIC
COLOR IMAGES
Walter Schulte, Opladen, and Heinz Meckl, Cologne-Flittard, Germany, assignors to Agfa Aktiengesellschaft, Leverkusen, Germany, a corporation of Germany
No Drawing. Filed June 5, 1962, Ser. No. 200,070
Claims priority, application Germany, July 28, 1961,
A 37,997
15 Claims. (Cl. 96—55)

This invention relates to novel organic compounds which are very useful as color coupler for color photography as well as to a color-photographic material containing said coupler components and a process for the production of cyan dyestuff photographic images by reacting the color couplers according to the invention with the oxidation products of color-forming developers.

In the production of photographic color images, it is common practice to use derivatives of phenol and naphthol as color couplers for the cyan image. Indophenol dyestuffs are formed upon coupling with the oxidation products of a primary aromatic amine developer. Thus, for example, in U.S. Patent 2,472,910, 5,6,7,8-tetrahydro-1-hydroxy-2- and -3-naphthamidobenzaldehydes and their lower acetals are described as cyan couplers in photographic material.

The dyestuffs obtained by coupling with the known color developers, such as N-diethyl-p-phenylene diamine, have desirable spectral properties, but they have only a low resistance to heat. Furthermore, it is known to use the 1-hydroxy-2-naphthoic acid anilide of 1-amino-2-methyl-octadecylaminobenzene-5-sulphonic acid as a color coupler. Cyan dyestuffs obtained with this color coupler turn yellow as does the coupler, on exposure to light.

An object of the present invention is to provide novel color couplers. A further object is to provide photographic elements which contain a new class of tetrahydronaphthol derivatives which are stable to heat and light and which form upon development with a color-forming developer a cyan dye of the proper spectral characteristics for multi-color-photography. Still other objects will be apparent to those familiar with color-photography from the following description.

It has been found that cyan dyestuffs which are resistant to both light and heat and which have a very fine grain and favourable absorption properties are obtained by using, as couplers, compounds of the following general formula:

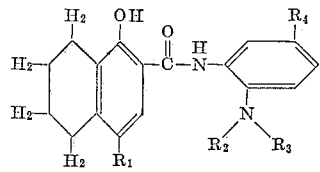

wherein the symbols $R_1$ to $R_4$ have the following meaning:

$R_1$=H, $SO_3H$ or their salts with alkali or alkaline earth metals, ammonia or amines, preferably however with alkali metals
$R_2$=alkyl with 1 to 5 carbon atoms
$R_3$=alkyl with 8 to 18 carbon atoms
$R_4$=H, $SO_3H$, $SO_2NH_2$, it being possible for the amino group to be substituted by short-chain aliphatic radicals or by aryl groups.

These new color couplers are prepared by reacting the phenyl ester of 5,6,7,8-tetrahydro-1-hydroxy-naphthoic acid-(2) with an amine of the following general formula

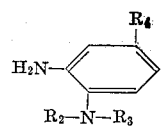

in which $R_2$, $R_3$ and $R_4$ have the previously specified meanings.

The anilides of tetrahydro-1-hydroxy-naphthoic acid-(2) or -N-phenyl-substituted 1-hydroxy-5,6,7,8-tetrahydro-2-naphthamides which are formed are purified by treatment with glacial acetic acid or alcohol. The compounds may be sulphonated in the p-position to the hydroxyl group by subsequent action of concentrated sulphuric acid in order to increase the alkali solubility.

Examples of suitable couplers for the production of the cyan dyestuffs are:

Coupler 1:

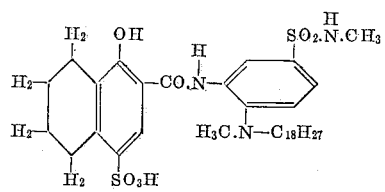

N - [2 - (N - methyl - N - n - octadecylamino) - 5 - (N-methylsulfamoyl)phenyl] - 1 - hydroxy - 5,6,7,8 - tetrahydro-2-naphthamide.

Coupler 2:

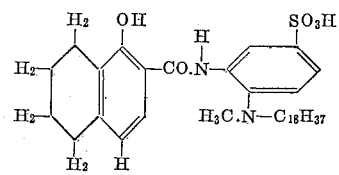

N - [2 - (N - methyl - N - n - octadecylamino) - 5 - sulfophenyl]-1-hydroxy-5,6,7,8-tetrahydro-2-naphthamide.

Coupler 3:

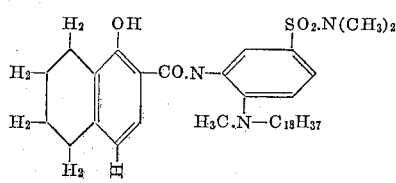

N - [2 - (N - methyl - N - n - octadecylamino) - 5 - (N,N-dimethylsulfamoyl)phenyl] - 1 - hydroxy - 5,6,7,8 - tetrahydro-2-naphthamide.

Coupler 4:

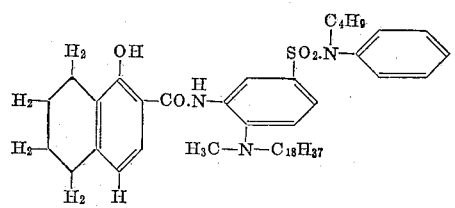

N - [2 - (N - methyl - N - n - octadecylamino) - 5 - (N-phenyl - N - n - butylsulfamoyl)phenyl] - 1 - hydroxy-5,6,7,8-tetrahydro-2-naphthamide.

Coupler 5:

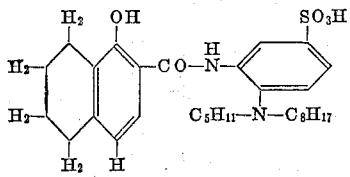

N - [2 - (N - n - pentyl - N - n - octadecylamino) - 5-sulfophenyl] - 1 - hydroxy - 5,6,7,8 - tetrahydro - 2-naphthamide.

Coupler 6:

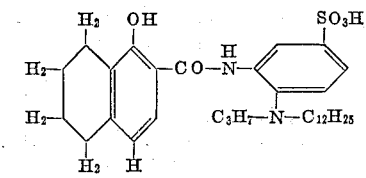

N - [2 - (N - n - propyl - N - n - dodecylamino) - 5-sulfophenyl] - 1 - hydroxy - 5,6,7,8 - tetrahydro - 2-naphthamide.

Coupler 7:

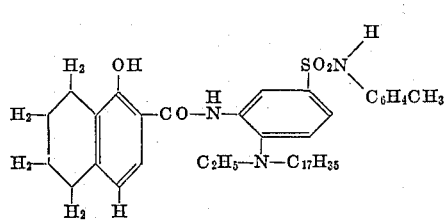

N - [2 - (N - ethyl - N - n - heptadecylamino) - 5 - (N-tolylsulfamoyl)phenyl] - 1 - hydroxy- - 5,6,7,8 - tetrahydro-2-naphthamide.

Coupler 8:

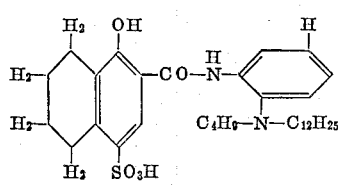

N - [2 - (N - n - butyl - N - n - dodecylamino)phenyl]-1-hydroxy-5,6,7,8-tetrahydro-2-naphthamide.

EXAMPLE 1

*Production of coupler 1*

29.5 g. of phenyl 1-hydroxy-5,6,7,8-tetrahydro-2-naphthoate, prepared by reaction of 1-hydroxy-5,6,7,8-tetrahydro-2-naphthoic acid with phenol in the presence of POCl₃, were heated with 47 g. of 2-(N-methyl-N-n-octadecylamino) - 5 - (N - methylsulfamoyl)aniline (M.P. 83° C.) in a flask at a temperature of 190–200° C. The phenol split off was distilled off. After completion of the reaction, the contents of the flask were cooled to about 100° C., dissolved in 60 ml. of acetone and the resulting solution diluted with 300 ml. of methanol. After standing overnight, the precipitated product was suction-filtered and purified by recrystallization from methanol.

Yield: 56 g., M.P.=74° C.

*Sulphonation*

50 g. of the product thus prepared were slowly introduced, while stirring, into 300 ml. of concentrated sulphuric acid at 50° C. 56 g. of sulphonated product were obtained after working up in the customary manner.

*Photographic application*

A solution of 1.5 g. of the color coupler in 15 ml. of 1-normal sodium hydroxide solution was added to 100 ml. of a photographic silver bromide emulsion. The emulsion was applied to a prepared film support and dried. After exposure, the film was developed in the following developer:

| | G. |
|---|---|
| N-diethyl-p-phenylene diamine·H₂SO₄ | 2.8 |
| Sodium carbonate | 70.0 |
| Sodium sulphite | 2.0 |
| Sodium bromide | 2.0 |

Made up with water to 1000 ml.

After development, the film was rinsed, bleached and fixed. A cyan image was obtained.

The dyestuff thus obtained remained unaltered as regards color tone and density on being treated for 7 hours at 100 C. (Density before treatment: 2.4; density after treatment: 2.4.)

A comparison dyestuff of 1-hydroxy-5,6,7,8-tetrahydro-2-naphthamidobenzaldehyde (U.S. Patent 2,472,910) and the oxidation product of N-diethyl-p-phenylene diamine was substantially destroyed when subjected to the aforementioned treatment. (Density before treatment: 2.9; density after treatment: 0.18.)

EXAMPLE 2

*Production of coupler 2*

29.5 g. of phenyl 1-hydroxy-5,6,7,8-tetrahydro-2-naphthoate and 53.0 g. of the sodium salt of 3-amino-4-(N-methyl-N-n-octadecylamino)-benzenesulfonic acid (90 percent) were slowly heated to 180° C. in 200 ml. of o-dichlorobenzene. About 150 ml. were distilled off within 3 hours and the temperature rose to 190° C. The residue was then diluted with 150 ml. of glacial acetic acid at approximately 100° C. On cooling, the sodium salt of color coupler 2 crystallized out.

*Photographic application*

A solution of 1.5 g. of color coupler 2 in 15 ml. of dilute sodium hydroxide solution was added, as in Example 1, to a gelatino-silver bromide emulsion. The resulting emulsion was applied to baryta-coated paper, dried, exposed to light and developed in the developer employed in Example 1. The further processing was carried out as described in Example 1.

The color image thus obtained was subjected to a light-fastness test by exposing it to sunlight for 5 days. After this time, the unreacted color coupler and the dyestuff obtained by coupling were scarcely changed. The comparison color coupler 1-hydroxy-2-naphthoic acid-[2'-methyl-n-octadecylamino-5'-sulphonic acid]-anilide, showed upon this test strong yellowing and the coupling dyestuff had faded appreciably by this time.

EXAMPLE 3

*Production of coupler 3*

29.5 g. of phenyl 1-hydroxy-5,6,7,8-tetrahydro-2-naphthoate were heated with 48.1 g. of 2-(N-methyl-N-n-octadecylamino-5-(N-n-dimethylsulfamoyl)aniline (M.P. 102° C.) to 180–190° C., as described in Example 1. Working up was effected as described in Example 1.

*Photographic application*

1.5 g. of coupler 3 were dissolved in a mixture of 3.0 g. of dibutyl phthalate and 10 ml. of ethyl acetate. The resulting solution was emulsified in 80 ml. of water containing 0.2 g. of lauryl sulphate. Part of the water and the ethyl acetate were evaporated off by heating the solution. The remaining dispersion was added to 100 ml. of a photographic gelatino-silver halide emulsion. The emulsion was applied in the usual manner to a prepared film support. After exposure, the film was developed and processed as described in Example 1.

The compounds according to the invention may be used either in the developing solution or in the sensitive emulsion layers. Where the compounds are of suitable molecular size, they may be incorporated in the sensitive emulsion layer or in one of the layers of a multi-layer material. The incorporation may be achieved either in the form of an aqueous alkaline solution or by dissolving the color coupler in an organic solvent, if desired with the addition of a sparingly soluble organic crystalloid, and by emulsifying said solution into the silver halide emulsion. The processing of the exposed color material, containing in one layer a cyan coupler according to the invention, is accomplished in a manner well known by first developing the material with a developer composition containing a color forming developer. Said developers generally speaking are characterized by a content of a primary amino group or a substituted amino group, the substituent of which being split off during the development, e.g. as described in German specification No. 926,713. Very useful color developers are for example N,N-diethyl-p - phenylene-diamine, N-ethyl-N-hydroxy-ethyl-p-phenylene-diamine, N-butyl-N-sulphobutyl-p-phenylene-diamine, N - ethyl-N-methyl sulfoamino-ethyl-p-phenylene-diamine or derivatives thereof being substituted in the phenylene nucleus, furthermore, 4-aminopyrazolone and derivatives thereof. The developer composition may be alkalized by alkali-metal carbonates, tertiary alkali-metal phosphates or alkali-metal hydroxides. The developers may contain any stabilizing agents, anti-fog agents and compounds protecting the composition against oxidation such as alkali sulphites or salts of hydroxylamine. The developing is followed by bleaching and fixing the color films. These procedures are well known to any person having ordinary skill in the art and need not to be described in detail.

Our color couplers may be used for the production of colored photographic images in layers of gelatin or other binding agents for the silver halide, such as organic esters of cellulose, polyvinyl alcohol, synthetic resins or the like.

The support for the emulsion may be a transparent material, such as glass, cellulose esters, polycarbonates or polyesters, in particular on the basis of ethylene glycol and terephthalic acid, or a non-transparent reflecting material, such as paper, in particular baryta-coated paper, or an opaque cellulose ester.

The emulsion containing the color coupler according to the invention may be coated as a single layer on the support or as one of a series of superposed layers on one or both sides of the support. The superposed layers may be differentially sensitized to record natural color-photographic images in the well-known manner. The light-sensitive layers containing the color couplers according to the invention may be composed of simple or mixed silver halides which may contain the usual sensitizers, desensitizers, stabilizers, fog inhibitors, emulsion hardeners, etc. Suitable types include silver chloride, silver bromide, silver chloro-bromide, silver chloride-bromide-iodide, silver bromide-iodide, etc., which may contain cyanine, carbocyanine, polymethine cyanine, cyazine, carbocyazine, pseudocyanine, kryptocyanine, mercocyanine, rhodanine, etc., salts and bases. The silver halide layers are anchored to the supports by means of the usual subbing solutions. Such solutions are also useful for anchoring dye component layers to bases.

What is claimed is:

1. A process for the production of cyan-colored photographic images which comprises developing a photographic material comprising an exposed silver halide emulsion layer containing a cyan coupler that is capable of developing a cyan-colored image upon reaction with the oxidation product of a primary amine color-forming developer, bleaching and fixing the developed material, said cyan coupler having the following general formula:

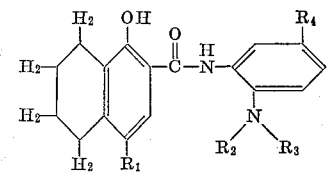

in which $R_1$ is a radical of the group consisting of hydrogen and sulfo; $R_2$ is an alkyl radical having up to 5 carbon atoms; $R_3$ is an alkyl radical having from 8 to 18 carbon atoms and $R_4$ is a radical of the group consisting of hydrogen, sulfo and $-SO_2N(X)_2$ in which X is a radical of the group consisting of hydrogen, lower alkyl and aryl.

2. A process as defined in claim 1 in which the cyan coupler has the following formula:

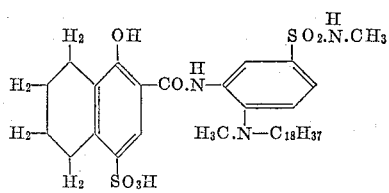

3. A process as defined in claim 1 in which the cyan coupler has the following formula:

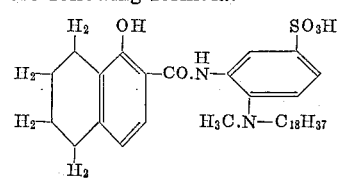

4. A process as defined in claim 1 in which the cyan coupler has the following formula:

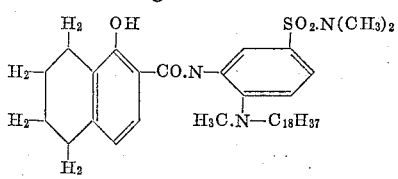

5. A process as defined in claim 1 in which the cyan coupler has the following formula:

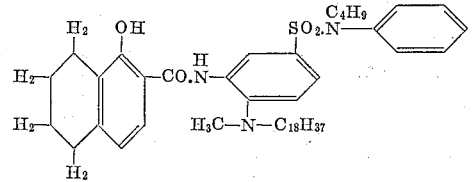

6. A photographic silver halide emulsion layer containing a cyan coupler that reacts with the oxidation product of a primary amine color-forming developer to form a cyan-colored image, the cyan coupler having the following general formula:

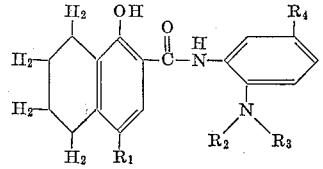

in which $R_1$ is a radical of the group consisting of hydrogen and sulfo; $R_2$ is an alkyl radical having up to 5 carbon atoms; $R_3$ is an alkyl radical having from 8 to 18 carbon atoms and $R_4$ is a radical of the group consisting of hydrogen, sulfo and $-SO_2N(X)_2$ in which X is a radical of the group consisting of hydrogen, lower alkyl and aryl.

7. A photographic silver halide emulsion layer as defined in claim 6 containing a color-coupler having the following formula:

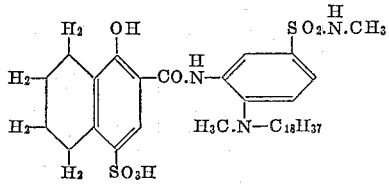

8. A photographic silver halide emulsion layer as defined in claim 6 containing a color-coupler having the following formula:

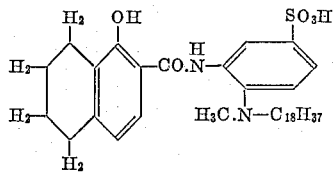

9. A photographic silver halide emulsion layer as defined in claim 6 containing a color-coupler having the following formula:

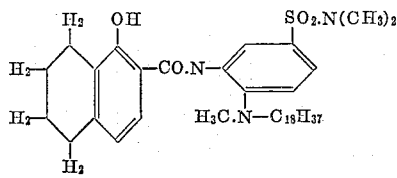

10. A photographic silver halide emulsion layer as defined in claim 6 containing a color-coupler having the following formula:

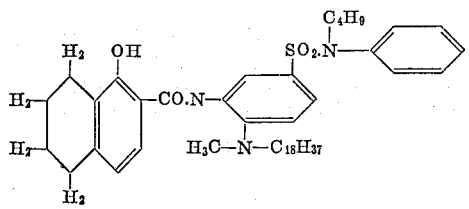

11. A photographic element having superposed silver halide emulsion layers sensitive to different regions of the visible spectrum, one of said layers containing a cyan coupler that reacts with the oxidation product of a primary amine color-forming developer to form a cyan-colored image, the cyan coupler having the following general formula:

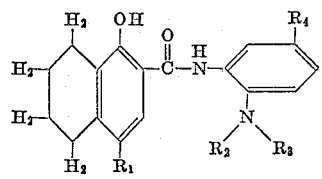

in which $R_1$ is a radical of the group consisting of hydrogen and sulfo; $R_2$ is an alkyl radical having up to 5 carbon atoms; $R_3$ is an alkyl radical having from 8 to 18 carbon atoms and $R_4$ is a radical of the group consisting of hydrogen, sulfo and $—SO_2N(X)_2$ in which X is a radical of the group consisting of hydrogen, lower alkyl and aryl.

12. A photographic element as defined in claim 11, at least one layer of which contains a color coupler having the following formula:

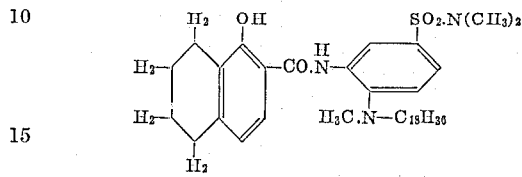

13. A photographic element as defined in claim 11, at least one layer of which contains a color coupler having the following formula:

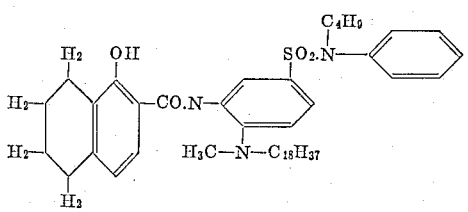

14. A photographic element as defined in claim 11, at least one layer of which contains a color coupler having the following formula:

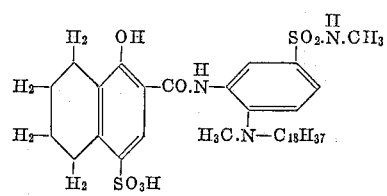

15. A photographic element as defined in claim 11, at least one layer of which contains a color coupler having the following formula:

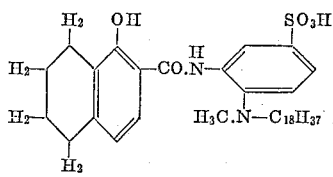

References Cited by the Examiner
UNITED STATES PATENTS 2,324,832   7/1943   Frohlich et al. _____ 96—100
2,472,910   6/1949   Martin _____ 96—55

NORMAN G. TORCHIN, Primary Examiner.

J. T. BROWN, Assistant Examiner.